United States Patent [19]

Coran et al.

[11] 4,348,502

[45] Sep. 7, 1982

[54] THERMOPLASTIC COMPOSITIONS OF NYLON AND ETHYLENE-VINYL ACETATE RUBBER

[75] Inventors: Aubert Y. Coran; Raman Patel, both of Akron, Ohio

[73] Assignee: Monsanto Company, St. Louis, Mo.

[21] Appl. No.: 227,893

[22] Filed: Jan. 23, 1981

[51] Int. Cl.³ .................... C08L 77/02; C08L 77/00
[52] U.S. Cl. .................... 525/183; 525/181; 524/87
[58] Field of Search ........................... 525/183

[56] References Cited

U.S. PATENT DOCUMENTS

| | | | |
|---|---|---|---|
| 3,516,961 | 6/1970 | Robb | 525/183 |
| 3,626,026 | 12/1971 | Fukumura et al. | 260/857 |
| 3,646,154 | 2/1972 | Marans et al. | 260/857 |
| 3,792,002 | 2/1974 | Krieger et al. | 260/18 N |
| 3,819,473 | 6/1974 | Russell et al. | 161/214 |
| 3,822,227 | 7/1974 | Hermann et al. | 260/28.5 A |
| 3,997,625 | 12/1976 | Ando et al. | 260/857 L |
| 4,018,733 | 4/1977 | Lopez | 525/183 |
| 4,174,358 | 11/1979 | Epstein | 525/183 |
| 4,319,007 | 3/1982 | Khattab | 525/183 |

FOREIGN PATENT DOCUMENTS

| | | | |
|---|---|---|---|
| 2425989 | 12/1974 | Fed. Rep. of Germany | 525/183 |
| 83463 | 7/1971 | German Democratic Rep. | 525/183 |
| 52-47052 | 4/1977 | Japan | 525/183 |
| 55-52364 | 4/1980 | Japan | 525/183 |
| 55-90575 | 7/1980 | Japan | 525/183 |
| 55-123639 | 9/1980 | Japan | 525/183 |

*Primary Examiner*—Paul Lieberman
*Attorney, Agent, or Firm*—Larry R. Swaney

[57] ABSTRACT

Thermoplastic compositions are described comprising blends of nylon and cured ethylene-vinyl acetate (EVA) rubber.

12 Claims, No Drawings

THERMOPLASTIC COMPOSITIONS OF NYLON AND ETHYLENE-VINYL ACETATE RUBBER

This invention relates to thermoplastic compositions comprising blends of nylon and ethylene-vinyl acetate (EVA) rubber, and more particularly, to compositions comprising blends in which the EVA rubber is cured.

BACKGROUND OF THE INVENTION

Elastoplastic compositions comprising blends of nylon and cured diene-based rubbers are known, for example, U.S. Pat. No. 4,173,556. The aforesaid elastoplastic compositions are described as being useful for making various articles by molding or extrusion, but their utility is limited to applications where heat stability or solvent resistance are not important. Accordingly, if these deficiencies can be overcome, articles could be used in applications where high temperatures or organic solvents are encountered.

SUMMARY OF THE INVENTION

It has been discovered that compositions comprising a blend of nylon and cured ethylene vinyl-acetate (EVA) rubber exhibit improved properties. Generally, compositions of the invention comprising a blend of about 15 to 75 parts by weight of nylon and, correspondingly, about 85 to 25 parts by weight of cured EVA rubber are thermoplastic compositions exhibiting improved strength, solvent resistance, temperature stability and greater toughness or impact resistance. Compositions comprising 50 or more parts by weight of nylon per 100 parts by weight of nylon and cured EVA rubber combined are thermoplastic compositions exhibiting improved impact resistance. Compositions comprising 50 or more parts by weight of cured EVA rubber per 100 parts by weight of nylon and cured EVA rubber combined are elastoplastic, i.e., they exhibit elastomeric properties, yet are processable as thermoplastics.

Generally, elastoplastic compositions of the invention comprise blends of nylon in an amount sufficient to impart thermoplasticity up to 50 weight percent of the composition, and cured EVA rubber in an amount sufficient to impart rubberlike elasticity up to 85 weight percent of the composition. More preferred compositions comprise 20–50 parts by weight of nylon and, correspondingly, 80–50 parts by weight of cured EVA rubber. Blends containing lesser proportions of nylon generally exhibit better tension set, whereas, blends containing greater proportions of nylon exhibit higher stress-strain properties, including true stress at break, TSB.

The relative proportions of nylon and cured EVA rubber of the elastoplastic compositions of the invention are not subject to absolute delineation because the limits vary, due to a number of factors including type, molecular weight, or molecular weight distribution of the nylon or rubber, the type of rubber, and type and amount of curative used to cure the rubber. The amount of nylon must be sufficient to impart thermoplasticity to the compositions, and the amount of cured EVA rubber must be sufficient to impart rubberlike elasticity to the composition. The term "rubberlike elasticity" means for the composition to have a tension set value of about 50% or less. The range or proportions for which the composition is elastoplastic may be ascertained in a few simple experiments by those skilled in the art by following the teachings herein.

It is important for thermoplasticity that the cured EVA rubber is present in the form of small dispersed particles, otherwise, the composition will either be weak or not processable as a thermoplastic. If the rubber is not dispersed and forms a somewhat continuous phase throughout the blend, a thermoset composition, not processable as a thermoplastic, may be obtained. The dispersed rubber particles must be small enough to maintain the strength and thermoplasticity of the composition. If the particles are too large, weak, low strength blends are obtained. Compositions containing still larger particles may not be processable as thermoplastics. Accordingly, it is understood that in elastoplastic compositions of the invention, the particle size is small enough to maintain high strength and thermoplasticity. Generally, the cured rubber particles are of a size of about 50 microns number average or less. The smaller the particle size, the better the properties, including strength and processability. Preferably, the particle size is about 10 microns number average or less. The dynamic curing process, when carried out properly, can give cured rubber particles within the range of about 0.1 to 2 microns number average.

In order to achieve an improved composition of the invention, it is essential that the EVA rubber is cured with enough rubber curative so that the rubber is cured sufficiently to give a composition having a substantially greater tensile strength than a corresponding blend containing uncured rubber. Preferably sufficient rubber curative is used to also give at least a 50% increase in tensile strength. In preferred compositions, the extent of cure of the rubber is such that the true stress at break, TSB, is at least two times the TSB of the similar blend in which the rubber is uncured.

Elastoplastic compositions of the invention are preferably prepared by a dynamic vulcanization process which comprises masticating a mixture of melted nylon, EVA rubber, and curative, at a curing temperature until curing is complete. Conventional rubber masticating equipment, for example, Banbury Mixers, Brabender Mixers, and mixing extruders, may be used to carry out the dynamic vulcanization process. The nylon and EVA rubber typically are mixed at a temperature above the nylon melting point, after which curative is added. Mastication at vulcanization temperature is continued until vulcanization is complete, generally within a few minutes, depending on the temperature. To obtain thermoplastic elastomeric compositions, it is desirable that mixing continues without interruption until vulcanization is complete. If appreciable curing is allowed after mixing has stopped, a thermoset unprocessable composition may be obtained. Frequently, the cured blend is removed from the mixer and cooled, then returned and masticated again above the melting point of the nylon. The additional mastication step may generally improve the processability of the composition, especially when higher proportions of rubber are used. For further details concerning dynamic vulcanization, refer to U.S. Pat. No. 4,173,556, particularly Columns 2–5.

The particular results obtained by the aforesaid dynamic curing process are a function of the particular rubber curing system selected. Preferably, enough curative is used to crosslink the rubber to the extent that the crosslink density of the rubber is in the order of about $3 \times 10^{-5}$ to $3 \times 10^{-4}$ moles per milliliter of rubber. Of course, the crosslink density should not be too high lest the properties of the composition be impaired.

Methods other than the dynamic vulcanization of EVA rubber/nylon blends can be utilized to prepare compositions of the invention. For example, the rubber can be fully vulcanized in the absence of the nylon, either dynamically or statically, powdered, and mixed with the nylon at a temperature above the melting or softening point of the nylon. Provided that the crosslinked rubber particles are small, well dispersed and in an appropriate concentration, the compositions within the invention are easily obtained by blending crosslinked EVA rubber and nylon. Accordingly, the term "blend" herein means a mixture comprising well dispersed small particles of crosslinked EVA rubber. A mixture which is outside of the invention because it contains poorly dispersed or too large rubber particles can be comminuted by cold milling (to reduce particle size to below about $50\mu$, preferably below $10\mu$ and more preferably to below $5\mu$). After sufficient comminution or pulverization, a composition of the invention is obtained. Frequently, the case of poor dispersion or too large rubber particles is visibly obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

The term "EVA rubber" as used herein and in the claims, means rubbery amorphous copolymers of ethylene and vinyl acetate containing 40 to 70 percent, more preferably, 45 to 60 percent by weight vinyl acetate. Some crystallinity may be present, but essentially completely amorphous rubbers are preferred. Density increases with vinyl acetate content with satisfactory rubbers generally having densities between 0.94–1.04. EVA rubbers are prepared by free radical initiated polymerization of ethylene and vinyl acetate at ultra high pressure. The average molecular weight of the copolymer is usually between 100,000 and 400,000. Suitable ethylene/vinyl acetate copolymers and formulation variables are described in greater detail in *Rubber Age,* June 1971, pp. 37–47, July 1971, pp. 63–70, and *Rubber World,* August 1976, p. 27. EVA rubber is commercially available under the trade name Vynathene.

Suitable nylons comprise thermoplastic crystalline or resinous high molecular weight solid polymers including homopolymers, copolymers and terpolymers having recurring amide units within the polymer chain. Both fiber-forming and molding grade nylons are satisfactory. Commercially available nylons may be advantageously used in the practice of the invention with nylons having softening or melting points between 160°–270° C. being preferred. Examples of suitable nylons are polycaprolactam, polylauryllactam, polyhexamethyleneadipamide, polyhexamethyleneazelamide, polyhexamethylenesebacamide, polyhexamethyleneisophthalamide, and their copolymers. Additional examples of suitable nylons are described in Encyclopedia of Polymer Science and Technology, Vol. 10, pp. 392–414.

The compositions of the invention are all processable in an internal mixer, to products which, upon transferring at temperatures above the softening or crystallizing point of the nylon, to the rotating rolls of a rubber mill, form continuous sheets. The sheets are reprocessable in the internal mixer, after reaching temperatures above the softening or melting points of the nylon. The material is again transformed to the plastic state, but upon passing the molten product through the rolls of the rubber mill, a continuous sheet again forms. In addition, a sheet of elastoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles may be formed therefrom by extrusion or injection molding.

The particular results obtained by the aforedescribed dynamic curing process are a function of the particular EVA rubber curing system selected. Any curative or curative system applicable for vulcanizing EVA rubbers may be used in the practice of the invention. The selection of any particular vulcanizing system varies, depending upon the nature of the nylon and the EVA rubber. A preferred curative system comprises an organic peroxide which has a half-life at the mixing temperature which permits thorough mixing of the EVA rubber and nylon before the peroxide is entirely consumed. The use of curative co-agents, which suppress the tendencies of peroxide curatives to decompose prematurely, may be used to extend the range of satisfactory curing temperatures. Peroxide curative systems containing acrylate co-agents are preferred. High energy radiation is also utilizable as the curative means.

Examples of suitable peroxide curatives are bis-2,4-dichlorobenzoyl peroxide, dicumyl peroxide, di-t-butyl-peroxide, 2,5-dimethyl-2,5-bis(t-butylperoxy)hexane, 1,1-bis(t-butylperoxy)-3,3,5-trimethyl cyclohexane, tris-$\alpha,\alpha$-dimethyl-$\alpha$(t-butylperoxy)methyl benzene, $\alpha,\alpha$-bis(butylperoxy)diisopropyl benzene, and t-butyl perbenzoate. Examples of suitable poly functional crosslinking agents which may be used are dibenzo-p-quinonedioxime, p-quinonedioxime, n-phenylene bismaleimide, triallyl cyanurate, ethylene glycol dimethacrylate, pentaerythritol triacrylate, trimethylolpropane triacrylates, tetraethylene glycol dimethacrylate, and neopentylglycol diacrylates. Additional examples of acrylate crosslinking agents are listed in the 1975 *Rubber World Blue Book* on page 398.

The amount of curative varies depending upon the type of curative and the composition of the blend. Enough curative must be used to crosslink the rubber, but excessive quantities of curatives beyond the amount necessary to fully cure the rubber should be avoided. Over cure can result in the diminution of properties. Preferably enough curative is used to cure the rubber to the extent that it is at least 90 percent insoluble in toluene at room temperature.

The properties of the elastoplastic compositions of the invention may be modified, either before or after vulcanization, by the addition of ingredients which are conventional in the compounding of EVA rubber, nylon and blends thereof. Examples of such ingredients include carbon black, silica, titanium dioxide, colored pigments, clay, zinc oxide, stearic acid, accelerators, vulcanizing agents, stabilizers, antidegradants, processing aids, adhesives, tackifiers, rubber plasticizers, wax, discontinuous fibers such as wood cellulose fibers and extender oils. The addition of carbon black, rubber plasticizer or both, preferably prior to dynamic vulcanization, are particularly recommended. Preferably, the carbon black and/or rubber plasticizer is masterbatched with the rubber and the masterbatch is mixed with the nylon. Carbon black improves the tensile strength and rubber plasticizer can improve the resistance to oil swell, heat stability, hysteresis, cost and permanent set of the elastoplastic compositions. Typical additions of carbon black comprise about 2–100 parts by weight of carbon black per 100 parts by weight of rubber and usually about 25–60 parts by weight carbon black per 100 parts total weight of rubber. The amount of carbon black which can be used depends, at least in part, upon the type of black and the amount of plasticizer present.

When a rubber plasticizer is added to the rubber, the range or proportions of nylon to EVA rubber in the composition is extended while still retaining elastoplasticity. For example, with plasticizer, the ratio of of nylon to EVA rubber may be increased without losing rubberlike plasticity. Plasticized EVA rubber containing up to 50 parts by weight, preferably between 10–40 parts by weight, plasticizer per 100 parts by weight EVA rubber are particularly suitable. The higher the molecular weight of the rubber, the more plasticizer can be used. Of course, it is understood that plasticizer need not be present prior to curing the rubber, although it is generally more desirable, and that the properties of elastoplastic composition of the invention may be modified by the addition of plasticizer after the rubber is cured. Generally, the quantity of plasticizer, when present, is between 10–30 weight percent of the total composition. Any plasticizer suitable for EVA rubber may be used. Suitable plasticizers include polypropylene glycol, phthalate esters such as dicyclohexyl phthalate, dimethyl phthalate, dioctyl phthalate, butyl benzyl phthalate, benzyl phthalate, phosphates such as tributoxyethyl phosphate, tributyl phosphate, tricresyl phosphate, cresyl diphenyl phosphate, 2-ethylhexyl diphenyl phosphate, isodecyl diphenyl phosphate, and triphenyl phosphate, and phthalyl glycolates such as butyl phthalyl butyl glycolate.

Elastoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with thermoplastics, in particular, nylons. The compositions of the invention are blended with thermoplastics by using conventional mixing equipment. The properties of the blend depend upon the proportions. Generally, the amount is such that the blend contains sufficient crosslinked rubber to obtain the desired effect.

Tensile properties of the composition are determined by ASTM procedures D1708-66 and D638. Specimens are pulled with a tensile tester at 2.5 cm. per minute up to 30 percent elongation and 25.4 cm. per minute to failure. The term "elastomeric" as used herein and in the claims, refers to rubberlike elasticity, the property of forcibly retracting within ten minutes to less than 150% of its original length after being stretched at room temperature to twice its unstressed length and held for ten minutes before release (e.g. tension set is 50% or less). True stress at break (TSB) is the tensile strength at break multiplied by the extension ratio also at break, extension ratio being the length of a tensile test specimen at break divided by the original, unstressed length of the test specimen. Alternatively, extension ratio is 1.00 plus 1/100 of the percent ultimate elongation. Especially preferred compositions of the invention are rubbery compositions having tension set values of about 50% or less. A more preferred composition additionally has a Young's modulus, E, below about 300 MPa.

DESCRIPTION OF THE PREFERRED EMBODIMENTS

Compositions illustrating the invention are prepared by charging nylon and EVA rubber, in the indicated amounts (all parts by weight) to a Brabender mixer with an oil bath temperature of about 160° C. The EVA rubber and nylon are mixed until the stock temperature is about 150° C. and the curative is then added. The mixing speed is varied to maintain the stock temperature at about 170° C. After maximum Brabender consistency is reached (generally between 2 and 6 minutes) 0.5 parts of trisnonylphenylphosphite per 100 parts of EVA rubber are added, and mastication is continued for two additional minutes. The composition is removed, cooled, and then returned to the Brabender mixer and mixed an additional 2–2½ minutes. The material is then sheeted and compression molded at about 225° C. The test specimens are annealed by heating at 75° C. for 2 hours and then slowly cooling to room temperature. Properties of the molded sheet are then measured and recorded.

Materials used to illustrate the invention are as follows: the EVA rubber is a copolymer of about equal weight proportions of ethylene and vinyl acetate. The nylon is a terpolymer of nylon 6 (50%), nylon 6-6 (31%), and nylon 6-10 (19%), m.p. 160° C. Flectol H is the trade name for a polymeric 1,2-dihydro-2,2,4-trimethylquinoline antioxidant. TAC is triallylcyanurate, a curative co-agent. The peroxide curative is 2,5-dimethyl-2,5-bis-(t-butylperoxy)hexane (90% active).

The effect of curing the rubber and the effect of the nylon/rubber proportions are shown in Table 1. Control Stocks 1–5 and 7 are prepared without curatives. The properties of the controls are shown in parentheses. The data show that, except for Stocks 1 and 2 containing high proportions of nylon, curing the rubber substantially improves properties. For example, curing the rubber increases tensile strength and true stress at break (TSB) in all compositions containing 30 or more parts by weight of rubber. All compositions, except Stock 9, are processable as thermoplastics. Stock 9 is moldable but will not form a continuous sheet on a mill. Compositions containing 60 or more parts by weight of rubber are elastomeric.

TABLE 1

|  | 1 | 2 | 3 | 4 | 5 | 6 | 7 | 8 | 9 |
|---|---|---|---|---|---|---|---|---|---|
| Stock |  |  |  |  |  |  |  |  |  |
| Nylon | 90 | 80 | 70 | 60 | 50 | 40 | 30 | 20 | 10 |
| EVA Rubber | 10 | 20 | 30 | 40 | 50 | 60 | 70 | 80 | 90 |
| FLECTOL® H | 0.1 | 0.2 | 0.3 | 0.4 | 0.5 | 0.6 | 0.7 | 0.8 | 0.9 |
| TAC | 0.1 | 0.2 | 0.3 | 0.4 | 0.5 | 0.48 | 0.7 | 0.8 | 0.9 |
| Peroxide | 0.1 | 0.2 | 0.3 | 0.4 | 0.5 | 0.48 | 0.35 | 0.4 | 0.45 |
| Properties |  |  |  |  |  |  |  |  |  |
| TS, MPa | 43 | 43 | 39 | 35 | 31 | 22 | 15 | 11 | 7.7 |
|  | (47) | (51) | (21) | (7.0) | — | — | (1.4) | — | — |

TABLE 1-continued

|  | 1 | 2 | 3 | 4 | 5 | 6 | 7 | 8 | 9 |
|---|---|---|---|---|---|---|---|---|---|
| $M_{100}$, MPa | 25 | 27 | 22 | 19 | 16 | 13 | 8.2 | 4.0 | 2.0 |
|  | (27) | (28) | (21) | (7.0) | — | — | (0.4) | — | — |
| E, MPa | 605 | 751 | 558 | 398 | 311 | 122 | 40 | 7.6 | 2.4 |
|  | (1358) | (869) | (558) | (43) | — | — | (0.9) | — | — |
| Ultimate Elong., % | 350 | 330 | 340 | 340 | 340 | 280 | 300 | 380 | 370 |
|  | (360) | (380) | (100) | (120) | — | — | (1410) | — | — |
| Ten. Set, % | 87 | 91 | 85 | 76 | 66 | 46 | 29 | 11 | 8 |
|  | (88) | (89) | (80) | Broke | — | — | (42) | — | — |
| TSB, MPa | 192 | 182 | 170 | 150 | 138 | 82 | 60 | 52 | 37 |
|  | (219) | (243) | (42) | (15) | — | — | (26) | — | — |

Compositions in which the nylon 6, 6-6, 6-10 is replaced by nylon 11 are similarly prepared. Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermoplastic composition comprising a blend of about 15 to 75 parts by weight of nylon and about 85 to 25 parts by weight of cured EVA rubber per 100 parts by weight of nylon and said EVA rubber combined in which the EVA rubber is an essentially amorphous copolymer of ethylene and 40 to 70 weight percent of vinyl acetate and is cured to the extent that the EVA rubber is at least 90 percent insoluble in toluene at room temperature.

2. The composition of claim 1 in which the EVA rubber is an essentially amorphous copolymer of ethylene and 45 to 60 percent of vinyl acetate.

3. The composition of claim 2 in which the nylon has a melting point between 160°–270° C.

4. The composition of claim 3 in which the nylon is nylon 11.

5. The composition of claim 3 in which the amount of EVA rubber is sufficient to impart rubberlike elasticity to the composition.

6. The composition of claim 5 in which the EVA rubber is present in the form of dispersed particles of a size of 10 microns number average or less.

7. The composition of claim 6 in which the nylon is nylon 6,6-6,6-10.

8. An elastoplastic composition comprising a blend of nylon in an amount sufficient to impart thermoplasticity up to 50 weight percent of the composition, and cured EVA rubber, in which the EVA rubber is an essentially amorphous copolymer of ethylene and about 40 to 70 weight percent of vinyl acetate which EVA rubber is cured to the extent that it is at least 90 percent insoluble in toluene at room temperature and is present in an amount sufficient to impart rubberlike elasticity up to 85 weight percent of the composition, which composition is processable as a thermoplastic and is elastomeric.

9. The composition of claim 8 comprising a blend of 20 to 50 parts by weight of nylon and 80 to 50 parts by weight of cured EVA rubber per 100 parts by weight of said nylon and said rubber combined.

10. The composition of claim 9 in which the nylon has a melting point between 160°–270° C.

11. The composition of claim 10 in which the EVA rubber is an amorphous copolymer of ethylene and 45 to 60 weight percent of vinyl acetate.

12. The composition of claim 11 in which the nylon is nylon 6,6-6,6-10.

* * * * *